United States Patent [19]

Kimura et al.

[11] 3,861,927

[45] Jan. 21, 1975

[54] ALKALI RESISTANT GLASS FIBERS

[75] Inventors: Isao Kimura; Takuji Yoshimura, both of Osaka, Japan

[73] Assignee: Kanebo, Ltd., Tokyo, Japan

[22] Filed: May 4, 1973

[21] Appl. No.: 357,461

[30] Foreign Application Priority Data
May 12, 1972 Japan.............................. 47-47535
Sept. 8, 1972 Japan.............................. 47-90779

[52] U.S. Cl......................... 106/50, 106/52, 106/54
[51] Int. Cl......................... C03c 3/08, C03c 13/00
[58] Field of Search .................... 106/50, 52, 54, 53

[56] References Cited
UNITED STATES PATENTS

| | | | |
|---|---|---|---|
| 2,566,134 | 8/1951 | Mockrin et al. ...................... | 106/52 |
| 2,640,784 | 6/1953 | Tiede .............................. | 106/54 X |
| 3,282,712 | 11/1966 | Tashiro et al..................... | 106/52 X |
| 3,485,702 | 12/1969 | Mochel............................ | 106/52 X |
| 3,783,092 | 1/1974 | Majumdar............................ | 106/52 |

FOREIGN PATENTS OR APPLICATIONS

| | | | |
|---|---|---|---|
| 7,011,037 | 2/1971 | Netherlands.......................... | 106/50 |

*Primary Examiner*—Winston A. Douglas
*Assistant Examiner*—Thomas A. Waltz
*Attorney, Agent, or Firm*—Woodhams, Blanchard and Flynn

[57] ABSTRACT

Glass fibers having a high alkali resistance are produced by melting a mixture consisting of

| | |
|---|---|
| $SiO_2$ | 56–76 mol% |
| $ZrO_2$ | 8–16 mol% |
| $R_2O$ | 1.5–25 mol% |
| $P_2O_5$ | 0.1–3 mol% |
| $B_2O_3$ | 0.5–7 mol% |
| $R'O$ | 0–10 mol% |
| $SnO_2$ | 0–7.5 mol% |
| Other metal oxide | 0–10 mol% |
| $CaF_2$ | 0–2 mol% | wherein R is Li, Na or K, R' is Ca, Mg, Sr, Ba, Be, Zn or Pb and said other metal oxide is $Al_2O_3$, $Fe_2O_3$, $TiO_2$ or $CeO_2$, to form a glass and melting the resulting glass and extruding the melt through nozzle orifices.

1 Claim, No Drawings

ALKALI RESISTANT GLASS FIBERS

The present invention relates to glass fibers having resistance against attack by aqueous alkali solutions, without loss of mechanical properties, particularly strength.

Glass fibers have the highest tensile strength as compared with other organic and inorganic fibers. Further, they have a low elongation, an excellent dimensional stability and a noninflammability. Accordingly glass fibers are compounded with thermosetting resins, such as an unsaturated polyester, an epoxy resin, a phenolic resin and the like or a thermo-plastic resin, such as ABS, polyester, polyamide, polyolefin and the like to form fiber reinforced plastics (FRP), which are presently used in large amounts and the production of which is expected to increase.

Furthermore it has been heretofore attempted to use the glass fibers having the above described excellent properties as reinforcing fibers for inorganic materials, particularly cement mortar or calcium silicate, which are widely used in building construction, as well as the organic materials, such as synthetic resins and various rubbers.

Presently the fibrous materials which have been practically used in this field are only natural asbestos.

Studies have been made about the use of glass fibers, organic natural fibers, such a cotton, hemp and the like and various synthetic fibers, such as polyvinyl alcohol, polyamide, polyester and polyacrylonitrile fibers as reinforcing materials for cement mortar or calcium silicate, but none of them has been used in practice. Because the composition of the glass fibers which is presently most usually employed, is insufficient in its resistance in an aqueous alkali solution, such fibers are corroded with the passage of time and their inherent excellent tensile strength is gradually reduced. Namely, when the glass fibers are introduced into cement mortar or a paste of calcium silicate, an unwanted phenomenon occurs due to the basic property of calcium hydroxide generated from these components and the desired function of the glass fibers as a reinforcing material is completely lost. This is accelerated by other physical factors, for example, the heat evolved during the solidification of cement mortar or paste of calcium silicate, or the externally applied heat or pressure.

On the other hand, organic natural fibers and various synthetic fibers are generally stable under basic conditions but they have no adhesion with cement mortar or calcium silicate, which forms the matrix. Further, the difference of the specific gravities of the fibers and the matrix is large and consequently the fibers and the matrix are separate in the mixture and further such fibers have a high residual elongation and are poor in their tensile strength and elasticity and therefore such fibers are not satisfactory as reinforcing fibrous material.

Thus, only asbestos is used in practice in such an inorganic matrix but asbestos is a natural product and there is a fear that supplies of asbestos will be exhausted in future and in practice, the quality is reduced and the cost is raised.

Furthermore, even when asbestos is used, the fiber length thereof is short and the fineness is small and the form of asbestos is nearly like powder and therefore the handling is difficult. In addition, since asbestos is a certain hydrous salt of metal oxide, a dehydration reaction occurs at an increased temperature and the inherent excellent mechanical properties thereof are degraded.

If alkali resistance is imparted to the glass fibers, said fibers can be produced in large amounts and they have a high tensile strength and a low elongation and therefore a high dimensional stability is obtained and the glass fibers are noninflammable. Moreover, the glass fibers and the cement mortar or calcium silicate matrix are similar in their specific gravities. Accordingly, the glass fibers can be advantageously used as a reinforcing material for cement mortar or calcium silicate matrix.

In this case, the drawbacks of the difference of specific gravity between the cement paste and the organic natural fibers and various synthetic fibers and of the heterogeneous dispersion in the mixture system due to the hydrophobic property of synthetic fibers, are obviated. Further the fineness of the glass fibers can be adjusted during spinning and therefore the drawbacks of asbestos wherein the fineness is too small and the fibers gather during the mixing with cement to cause a heterogeneous dispersion, can be obviated.

The inventors have studied the production of glass fibers in which the above mentioned inherent properties of glass fibers are not deteriorated and an alkali resistance is provided in such fibers and the present invention has been accomplished.

The present invention provides alkali resistant glass fibers having not more than 5 percent of alkali solubility and not less than 80 percent of strength retaining percentage. The fibers consist of

| | | |
|---|---|---|
| $SiO_2$ | 56–76 | mol% |
| $ZrO_2$ | 8–16 | mol% |
| $R_2O$ | 1.5–25 | mol% |
| $P_2O_5$ | 0.1–3 | mol% |
| $B_2O_3$ | 0.5–7 | mol% |
| $R'O$ | 0–10 | mol% |
| $SnO_2$ | 0–7.5 | mol% |
| Other metal oxide | 0–10 | mol% |
| $CaF_2$ | 0–2 | mol% | wherein R is Li, Na or K and R' is Ca, Mg, Sr, Ba, Be, Zn or Pb and said other metal oxide is $Al_2O_3$, $Fe_2O_3$, $TiO_2$ or $CeO_2$.

The term "alkali solubility" is an indication of the alkali resistance of fibers and it is determined by the following formula in a test wherein 2 g of glass fiber having a length of 10 cm is immersed in 1,000 cc of an aqueous solution of 10% NaOH at 100°C and heated at the same temperature for 1 hour in a closed system, then washed with water thoroughly and then dried and weighed (Wg).

Alkali solubility (%) = $(2-W)/2 \times 100$

The term "strength retaining percentage" is shown by the following formula

Strength retaining percentage (%) = $T_1/T_0 \times 100$

In this test fiber is treated for 6 hours under the same conditions as described above, then washed with water thoroughly and dried.

$T_1$ g/d : Strength of the thus treated fiber
$T_0$ g/d : Strength of fiber before the treatment.

In the present invention, the alkali solubility of glass fiber is not more than 5 percent, preferably not more than 3 percent, more particularly not more than 2 percent and the strength retaining percentage is not less than 80 percent, preferably not less than 90 percent, more particularly not less than 92 percent. When the alkali solubility exceeds 5 percent or the strength retaining percentage is less than 80 percent, the alkali resistance is insufficient and the object of the present invention can not be attained.

Hitherto it has been known that $ZrO_2$, is effective in chemical resistance, particularly alkali resistance, and also it has been known that alkali resistant glass fibers can be produced from glass, one component of which is $ZrO_2$. The amount of $ZrO_2$ in the glass has a relation to the alkali resistance of the glass fiber, for example, the weight decrease in a hot aqueous alkali solution and the strength decrease of the fiber after contacting with said solution. In general, as the amount of $ZrO_2$ increases, the alkali resistance is improved. However, in glass fibers wherein $ZrO_2$ is a component, the amount of $ZrO_2$ is limited to less than 11 mol percent to obtain glass forming ability and stable melt spinnability.

The present invention is characterized in that $P_2O_5$ and $B_2O_3$ are used together with $ZrO_2$. Both $P_2O_5$ and $B_2O_3$ have been previously used as starting materials of glass as glass forming agent, but it has not been known that a stable glass can be obtained by using $P_2O_5$ and $B_2O_3$ together with $ZrO_2$, and particularly, the defined composition range in which a stable melt spinnability is obtained has not been known.

The inventors have found that when both $P_2O_5$ and $B_2O_3$ are used, $ZrO_2$ can be stably used in amounts exceeding 11 mol percent and up to 16 mol percent and that the glass fibers can be produced with a good spinnability. Furthermore, the alkali resistance of glass fibers, that is, the weight decrease in a hot aqueous alkali solution and the strength decrease of fibers are improved by increasing the amount of $ZrO_2$. Therefore the glass fibers according to the present invention have excellent alkali resistance which has not been obtained heretofore. The glass fibers in the present invention have a high strength of original yarn and are very advantageous as a reinforcing material for an inorganic matrix, such as cement. When the glass fibers of the present invention are used in a cement paste, a further important effect can be obtained. Namely, Ca ion in the cement paste is bonded with $P_2O_5$ ion in the glass fiber to form a thin film of a water insoluble and alkali insoluble calcium phosphate on the surface of the glass fiber. This thin film acts as a protective film against an aqueous alkali solution and increases the alkali resistance of glass fibers and contributes to prevent the degradation of their mechanical properties. Moreover, the presence of the thin film serves to improve the adhesion between the glass fibers of the reinforcing material and the cement of the matrix.

Consequently, the cement complex wherein the glass fibers of the present invention are used as a reinforcing material or a filler has more excellent impact resistance, bending resistance and breakage resistance than is the case when glass fibers other than those of the present invention are used. Cracks hardly occur and slight cracks do not grow. This shows that the glass fibers of the present invention act effectively as a reinforcing material.

The concentration of $ZrO_2$ in the glass is preferred to be larger but when the concentration exceeds 16 mol percent, such a concentration is not covered by the glass formation zone and it is impossible to obtain a glass having a spinnability. On the other hand, when the concentration is less than 8 mole percent, both the glass formation and the spinnability are good, but the alkali resistance is degraded and the object of the present invention can not be attained. The preferable range is 10–16 mol percent, more preferably 12–16 mol percent. The more particular range is 12–15 mol percent. The glass fibers containing $ZrO_2$ in this range are excellent particularly in the alkali resistance and, for example, such glass fibers are preferable as reinforcing fibers for cement paste.

When the concentration of $P_2O_5$ exceeds 3 mol percent, the alkali resistance of the glass fibers is considerably deteriorated, so that even if the other properties are satisfactory, for example, the glass formation is easy, the spinnability is high and the strength of the original yarn is high, such fibers can not accomplish the object of the present invention. The preferable range of $P_2O_5$ is not more than 2 mol percent.

When the concentration of $B_2O_3$ exceeds 7 mol percent, the prepared glass is liable to cause the phase separation gradually and it is difficult to obtain homogeneous glass fibers and the alkali resistance decreases. The preferable range is 1–6 mol percent and 2–6 mol percent is particularly preferable.

The sum of the concentrations of $P_2O_5$ and $B_2O_3$ must be within the range of 1–9 mol percent and 4–8 mol percent is particularly preferable.

Among $R_2O$, the most generally useful R is Na and a typical oxide of R'O is CaO. The typical embodiment of the other metal oxide is $Al_2O_3$. These components, of course, may be used within the above described range and further $Na_2O$, CaO and $Al_2O_3$ may be used together with other $R_2O$, R'O and said "other metal oxide."

In order to improve the alkali solubility of the glass and promote the homogeneous glass formation and improve the spinnability and further to improve the yarn properties, such as the tensile strength and the like and improve further the alkali resistance, it is preferable to use both $SnO_2$ and $CaF_2$ together. In this case, $SnO_2$ is 0.5–6 mol percent and $CaF_2$ is 0.5–2 mol percent. When the concentrations of $SnO_2$ and $CaF_2$ are less than 0.5 mol percent respectively, it is impossible to effect removal of foams generated in the glass formation earlier and when the concentration of $SnO_2$ exceeds 6 mol percent, a homogeneous glass cannot be formed. By using 1–3 mol percent of R'O together, the glass can be formed more homogeneously.

A preferred embodiment according to the present invention which has a more improved homogeneous glass formation and alkali resistance consists in alkali resistant glass fibers having not more than 5 percent of alkali solubility and not less than 90 percent of strength retaining percentage which consist of

| | |
|---|---|
| $SiO_2$ | 60–67 mol% (36.05–40.25 parts by weight) |
| $ZrO_2$ | 12–16 mol% (14.79–19.72 parts by weight) |
| $R_2O$ | 16–20 mol% (9.92–12.4 parts by weight for $Na_2O$ |
| R'O | 1–3 mol% (0.56–1.68 parts by weight for CaO) |
| $B_2O_3$ | 2–6 mol% (1.39–4.18 parts by weight) |
| $P_2O_5$ | 1–3 mol% 1.42–4.26 parts by weight) |
| $SnO_2$ | 0.5–6 mol% (0.75–9.04 parts by weight) |
| $CaF_2$ | 0.5–2 mol% (0.39–1.56 parts by weight) | wherein R and R' have the same meanings and the sum of $P_2O_5$ and $B_2O_3$ is within a range of 4–8 mol percent.

The typical embodiment for carrying out the present invention will be explained hereinafter. Finely divided starting materials having a given composition are mixed thoroughly in a dry condition or after being wetted with water or a low temperature volatile organic liquid, such as acetone. Then the resulting mixture is filled in a crucible and melted at a given temperature for a given time. In general, platinum-rhodium (60/40 percent) alloy crucible, α-alumina or mullite crucible is used. The melting temperature is 1,400°–1,550°C, usually 1,450°–1,500°C and the time is at least 1 hour, usually 2–2.5 hours and if necessary, the melting time is more than 3 hours. The melted glass taken out from the melting furnace is usually introduced into water to form frit or allowed to cool in air to solidify and then it is crushed. This starting glass material is made to be of uniform grain size and then is charged into a spinning melter. The melter is composed of platinum-rhodium alloy (60/40 percent), α-alumina or mullite series heat resistant ceramic material and it has a plurality of circular orifices of 1–3 mm diameter at the bottom. The orifices in the nozzle are provided at the same level as the bottom of the nozzle or projected downwardly. The glass filled in the melter is heated at a temperature of 1,200°–1,500°C and is spun downwardly. The spun glass is wound continuously on a bobbin at a take-up velocity of 500–4,000 m/min. The temperature of the melter is adjusted so that the viscosity of the glass melt is 1,000–5,000 poises but at the above described composition range and melting temperature, the viscosity satisfies the above range and the spinning can be continued without causing yarn breakage for a long time. The diameter of the glass fiber can be varied by the variation of the take-up velocity and at the above described take-up velocity range, fibers of 5–30 μ can be obtained. The plurality of glass fibers extruded from the nozzle are applied with, for example a sizing agent of starch which is generally used in the production of glass fibers in order to decrease the occurrence of scratching owing to the mutual contact during the winding on a bobbin.

The thus obtained glass fibers have more excellent alkali resistance than the conventional glass fibers.

The following examples are given for the purpose of illustration of this invention and are not intended as limitations thereof.

"%" in the following examples means "mol%" and the measured value of the fiber strength is the average value after each of 30 filaments is measured by Instron universal tester.

COMPARATIVE EXAMPLE 1

A glass was prepared by melting a mixture of the following components in a mullite ceramic crucible at a temperature of 1,450°C.

| Component | % |
|---|---|
| $SiO_2$ | 57.8 |
| $Al_2O_3$ | 9.1 |
| CaO | 24.5 |
| $B_2O_3$ | 7.8 |
| $Na_2O$ | 0.5 |
| $K_2O$ | 0.3 |

The thus obtained glass was charged into a mullite ceramic melter having 24 orifices, diameter of each of which was 2.5 mm, and melted and extruded therefrom at a temperature of 1,420°C to form glass fibers. The glass fibers were wound on a bobbin at a take-up velocity of 1,000 m/min. The fiber had a fineness of 10.2 μ. The alkali solubility and strength before and after alkali treatment were measured with respect to the fiber to obtain the results as shown in the following Table 1.

Table 1

| Alkali solubility (%) | Strength (Kg/mm²) | | Strength retaining percentage after alkali treatment (%) |
|---|---|---|---|
| | Before alkali treatment | After* alkali treatment | |
| 12.8 | 105 | 6 | 5.7 |

*The fiber was treated with a 10% NaOH aqueous solution in a closed system at 100°C for 6 hours.

EXAMPLE 1

A mixture of the following components as shown in the following Table 2 was melted in a mullite ceramic crucible at 1,500°C in 2 hours to prepare a glass.

Table 2

| Component | Control No. 1 | Present invention No. 2 | No. 3 | No. 4 | No. 5 | Control No. 6 |
|---|---|---|---|---|---|---|
| $SiO_2$ | 73 | 70 | 68 | 65.5 | 63 | 60.5 |
| $ZrO_2$ | 5 | 8 | 10 | 12.5 | 15 | 17.5 |
| $Na_2O$ | 18 | 18 | 18 | 18 | 18 | 18 |
| CaO | 2 | 2 | 2 | 2 | 2 | 2 |
| $P_2O_5$ | 1 | 1 | 1 | 1 | 1 | 1 |
| $B_2O_3$ | 1 | 1 | 1 | 1 | 1 | 1 |

The obtained glass was charged into the same mullite ceramic melter as used in Comparative Example 1, and melted and extruded therefrom at a temperature of 1,450°C to form glass fibers. The fibers were wound on a bobbin at a take-up velocity of 1,000 m/min. The same test as described in Comparative Example 1 was made with respect to the fibers to obtain the results as shown in the following Table 3.

Further, in No. 6 of Table 2 crystals were precipitated during the melting and homogeneous glass was not obtained and the spinning was impossible.

Table 3

| Result | | Control No. 1 | No. 2 | Present invention No. 3 | No. 4 | No. 5 | Control No. 6 |
|---|---|---|---|---|---|---|---|
| Fineness (μ) | | 10.5 | 9.8 | 9.1 | 10.0 | 9.5 | — |
| Alkali solubility (%) | | 7.8 | 3.7 | 2.0 | 1.4 | 1.2 | — |
| Strength (Kg/mm²) | Before alkali treatment | 119 | 121 | 130 | 135 | 128 | — |
| | After alkali treatment | 89 | 106 | 124 | 130 | 125 | — |
| Strength retaining percentage after alkali treatment (%) | | 75 | 88 | 95 | 96 | 98 | — |

EXAMPLE 2

A mixture of the following components as shown in the following Table 4 was melted in a platinum alloy crucible at 1,530°C in 2.5 hours to prepare a glass, and the resulting glass was poured in water and taken out therefrom as frits.

Table 4

| Com-ponent | Control No. 7 | Present invention | | | | | Control No. 13 |
|---|---|---|---|---|---|---|---|
| | | No. 8 | No. 9 | No. 10 | No. 11 | No. 12 | |
| $SiO_2$ | 68 | 67.8 | 67.5 | 67 | 66 | 65 | 64 |
| $ZrO_2$ | 10 | 10 | 10 | 10 | 10 | 10 | 10 |
| $Na_2O$ | 20 | 20 | 20 | 20 | 20 | 20 | 20 |
| $P_2O_5$ | — | 0.2 | 0.5 | 1 | 2 | 3 | 4 |
| $B_2O_3$ | 1 | 1 | 1 | 1 | 1 | 1 | 1 |
| $CaF_2$ | 1 | 1 | 1 | 1 | 1 | 1 | 1 |

The thus obtained glass was charged into a platinum alloy melter having 30 orifices, the diameter of each of which was 2 mm, and melted and extruded therefrom at a temperature of 1,500°C to form glass fibers. The fibers were wound on a bobbin at a take-up velocity of 1,200 m/min. The same test as described in Comparative Example 1 was made with respect to the fibers to obtain the results as shown in the following Table 5.

EXAMPLE 3

A mixture of the following components as shown in the following Table 6 was melted in a mullite ceramic crucible at a temperature of 1,450°C in 2 hours to prepare a glass, and the resulting glass after being cooled was crushed and collected.

Table 6

| Component | Control No. 14 | Present invention | | | | Control No. 19 |
|---|---|---|---|---|---|---|
| | | No. 15 | No. 16 | No. 17 | No. 18 | |
| $SiO_2$ | 66 | 65 | 64 | 62 | 60 | 58 |
| $ZrO_2$ | 12.5 | 12.5 | 12.5 | 12.5 | 12.5 | 12.5 |
| $Na_2O$ | 20 | 20 | 20 | 20 | 20 | 20 |
| CaO | 1 | 1 | 1 | 1 | 1 | 1 |
| $P_2O_5$ | 0.5 | 0.5 | 0.5 | 0.5 | 0.5 | 0.5 |
| $B_2O_3$ | — | 1 | 2 | 4 | 6 | 8 |

The obtained glass was charged into the mullite ceramic melter as used in Comparative Example 1, and melted and extruded therefrom at a temperature of 1,430°C to form glass fibers. The fibers were wound on a bobbin at a take-up velocity of 900 m/min. The same test as described in Comparative Example 1 was made with respect to the fibers to obtain the results as shown in the following Table 7.

Table 5

| Result | | Control No. 7 | No. 8 | Present invention | | | | Control No. 13 |
|---|---|---|---|---|---|---|---|---|
| | | | | No. 9 | No. 10 | No. 11 | No. 12 | |
| Fineness ($\mu$) | | 9.3 | 8.0 | 7.9 | 8.5 | 8.8 | 9.0 | 10.6 |
| Alakali solubility (%) | | 3.8 | 2.2 | 1.7 | 2.0 | 2.6 | 3.3 | 4.5 |
| Strength Kg/mm² | Before alkali treatment | 98 | 125 | 140 | 152 | 138 | 141 | 145 |
| | After alkali treatment | 83 | 124 | 137 | 150 | 134 | 135 | 117 |
| Strength retaining percentage after alkali treatment (%) | | 85 | 99 | 98 | 99 | 97 | 96 | 81 |

Table 7

| Result | | Control No. 14 | Present invention | | | | Control No. 19 |
|---|---|---|---|---|---|---|---|
| | | | No. 15 | No. 16 | No. 17 | No. 18 | |
| Fineness ($\mu$) | | 13.5 | 12.1 | 12.8 | 13.8 | 12.5 | 11.9 |
| Alkali solubility (%) | | 2.5 | 1.2 | 1.3 | 1.3 | 1.5 | 2.8 |
| Strength Kg/mm² | Before alkali treatment | 123 | 128 | 131 | 138 | 132 | 130 |
| | After alkali treatment | 117 | 126 | 130 | 137 | 128 | 116 |
| Strength retaining percentage after alkali treatment (%) | | 95 | 98 | 99 | 99 | 97 | 89 |

In No. 14, yarn breakage was frequently caused and under the spinning was unstable.

COMPARATIVE EXAMPLE 2

A mixture of the following components was melted in the same manner and the same conditions as described in Example 3.

| Component | % |
|---|---|
| $SiO_2$ | 64.5 |
| $ZrO_2$ | 14 |
| $Na_2O$ | 20 |
| $CaO$ | 1 |
| $P_2O_5$ | 0.5 |
| $B_2O_3$ | — |

However, homogeneous glass was not obtained and the melt spinning, of course, became impossible. This shows that the presence of $B_2O_3$ is necessary in order to achieve the object of the present invention.

EXAMPLE 4

A mixture of the following components was melted in the same manner and under the same conditions as described in Example 3 to obtain a homogeneous glass.

| Component | % |
|---|---|
| $SiO_2$ | 62 |
| $ZrO_2$ | 9 |
| $Li_2O$ | 2 |
| $Na_2O$ | 20 |
| $P_2O_5$ | 1.5 |
| $B_2O_3$ | 4 |
| $SnO_2$ | 1 |
| $Al_2O_3$ | 0.5 |

The obtained glass was charged into the same melter as used in Example 3, and melted and extruded therefrom at a temperature of 1,400°C to form glass fibers. The fibers were wound on a bobbin at a take-up velocity of 1,000 m/min. The fiber had a fineness of 11.1 $\mu$. The same test as described in Comparative Example 1 was made with respect to the fibers to obtain a result as shown in the following Table 8.

Table 8

| Alkali solubility (%) | Strength ($Kg/mm^2$) Before alkali treatment | Strength ($Kg/mm^2$) After alkali treatment | Strength retaining percentage after alkali treatment (%) |
|---|---|---|---|
| 2.1 | 121 | 115 | 95 |

EXAMPLE 5

Into each of three wood frames having a dimension 4×14×0.8 cm/cm was charged 100 g of cement paste formed of a starting material of ordinary portland cement. Then, glass fibers in Comparative Example 1 and Example 2, No. 7 and No. 11 were cut in a length of 15 cm and the cut fibers were equally arranged over a width of 4 cm in the longitudinal direction to form a sheet, and 3 g of the resulting sheets were put sixfold on the cement paste. Further, 100 g of the same cement paste as described above was poured on the sheet. Under such a situation, the resulting assembly was left to stand in a room conditioned at 25°C and 65% RH for 28 days. Thereafter, the resulting solidified glass fiber reinforced composite cement was taken out from the wood frame and subjected to a bending test by means of an Instron universal tester to obtain the results as shown in the following Table 9.

Table 9

| Glass fiber used | Comparative Example 1 | No. 7 | No. 11 |
|---|---|---|---|
| $ZrO_2$ (%) | — | 10 | 10 |
| $P_2O_5$ (%) | — | — | 2 |
| Bending strength ($Kg/cm^2$) | 45 | 54 | 67 |

As seen from the results of Table 9, it can be seen that the glass fiber according to the present invention is very suitable for the reinforcing fibers for the composite cement.

EXAMPLE 6

A mixture of the following components as shown in the following Table 10 was melted in a mullite ceramic crucible at 1,500°C in 2 hours to prepare a glass.

Table 10

| Component | Present invention No. 20 | No. 21 | No. 22 | No. 23 | No. 24 | Control No. 25 |
|---|---|---|---|---|---|---|
| $SiO_2$ | 66.5 | 64.5 | 63.5 | 61.5 | 60.5 | 59.5 |
| $ZrO_2$ | 10 | 12 | 13 | 15 | 16 | 17 |
| $Na_2O$ | 18 | 18 | 18 | 18 | 18 | 18 |
| $CaO$ | 1.5 | 1.5 | 1.5 | 1.5 | 1.5 | 1.5 |
| $B_2O_3$ | 2 | 2 | 2 | 2 | 2 | 2 |
| $P_2O_5$ | 1 | 1 | 1 | 1 | 1 | 1 |
| $SnO_2$ | 0.5 | 0.5 | 0.5 | 0.5 | 0.5 | 0.5 |
| $CaF_2$ | 0.5 | 0.5 | 0.5 | 0.5 | 0.5 | 0.5 |

The thus obtained glass was charged into the same mullite ceramics melter as used in Comparative Example 1, and melted and extruded therefrom at a temperature of 1,450°C to form glass fibers. The fibers were wound on a bobbin at a take-up velocity of 1,000 m/min. The same test as described in Comparative Example 1 was made with respect to the fibers to obtain the results as shown in the following Table 11.

In No. 25 in Table 10, crystals were precipitated during the melting, so that homogeneous glass was not obtained and the spinning was impossible.

Table 11

| Result | | Present invention No. 20 | No. 21 | No. 22 | No. 23 | No. 24 | Control No. 25 |
|---|---|---|---|---|---|---|---|
| Fineness ($\mu$) | | 10.3 | 10 | 9.8 | 9.7 | 9.9 | — |
| Alkali solubility (%) | | 3.9 | 1.8 | 1.5 | 1.2 | 1.1 | — |
| Strength ($Kg/mm^2$) | Before alkali treatment | 121 | 143 | 145 | 149 | 140 | — |
| | After alkali treatment | 106.5 | 137.3 | 142.1 | 144.5 | 137.2 | — |
| Strength retaining percentage after alkali treatment (%) | | 88 | 96 | 98 | 97 | 98 | — |

EXAMPLE 7

By using platinum alloy crucible, the mixture having the following composition was melted at 1,550°C in 3 hours to form glass and the melt was poured into water to form frit.

Table 12

| Component | Present invention | | | | Control |
|---|---|---|---|---|---|
| | No. 26 | No. 27 | No. 28 | No. 29 | No. 30 |
| $SiO_2$ | 66.5 | 64.5 | 64 | 61 | 57 |
| $ZrO_2$ | 12 | 12 | 12 | 12 | 12 |
| $Na_2O$ | 18 | 18 | 18 | 18 | 18 |
| CaO | 1 | 1 | 1 | 1 | 1 |
| $B_2O_3$ | 1 | 2 | 3 | 4 | 6 |
| $P_2O_5$ | 0.5 | 1.5 | 1 | 2 | 5 |
| $SnO_2$ | 0.5 | 0.5 | 0.5 | 0.5 | 0.5 |
| $CaF_2$ | 0.5 | 0.5 | 0.5 | 0.5 | 0.5 |

The obtained glass was charged into a platinum alloy melter having 30 orifices, each orifice having a diameter of 2 mm and melted at 1,500°C and extruded and wound on a bobbin at a take-up velocity of 1,200 m/min. The resulting fibers were subjected to the same test as described in Comparative Example 1 to obtain the following results.

EXAMPLE 8

By using a mullite ceramic crucible, the mixture having the following composition was melted at 1,500°C in 3 hours and the melted glass was cooled and crushed.

Table 14

| Component | Present invention | | | | Control |
|---|---|---|---|---|---|
| | No. 31 | No. 32 | No. 33 | No. 34 | No. 35 |
| $SiO_2$ | 65.7 | 65 | 63 | 60 | 55 |
| $ZrO_2$ | 12 | 12 | 12 | 12 | 12 |
| $Na_2O$ | 18 | 18 | 18 | 18 | 18 |
| CaO | 1 | 1 | 1 | 1 | 1 |
| $B_2O_3$ | 2 | 2 | 2 | 2 | 2 |
| $P_2O_5$ | 1 | 1 | 1 | 1 | 1 |
| $SnO_2$ | 0.2 | 0.5 | 2 | 4 | 8 |
| $CaF_2$ | 0.1 | 0.5 | 1 | 2 | 3 |

The resulting glass was charged into mullite ceramic crucible and melted and extruded through the nozzle orifices and wound at a take-up velocity of 900 m/min. The resulting fibers were subjected to the same test as described in Comparative Example 1 to obtain the following results.

In No. 35, crystals were precipitated during the melting and the homogeneous glass was not obtained and the spinning was not conducted.

Table 13

| Result | | Present invention | | | | Control |
|---|---|---|---|---|---|---|
| | | No. 26 | No. 27 | No. 28 | No. 29 | No. 30 |
| Fineness ($\mu$) | | 9.5 | 9.2 | 9.8 | 9.7 | 9.6 |
| Alkali solubility (%) | | 3.8 | 1.8 | 1.2 | 1.5 | 4.0 |
| Strength ($Kg/mm^2$) | Before alkali treatment | 125 | 141 | 144 | 138 | 135 |
| | After alkali treatment | 107.5 | 135.4 | 141.1 | 133.9 | 111.7 |
| Strength retaining percentage after alkali treatment (%) | | 86 | 96 | 98 | 97 | 82 |

Table 15

| Result | | Present invention | | | | Control |
|---|---|---|---|---|---|---|
| | | No. 31 | No. 32 | No. 33 | No. 34 | No. 35 |
| Fineness ($\mu$) | | 9.7 | 9.5 | 9.9 | 9.3 | — |
| Alkali solubility (%) | | 3.1 | 1.7 | 1.3 | 1.2 | — |
| Strength ($Kg/mm^2$) | Before alkali treatment | 129 | 140 | 145 | 143 | — |
| | After alkali treatment | 118.6 | 135.8 | 139.2 | 140.1 | — |
| Strength retaining percentage after alkali treatment (%) | | 92 | 97 | 96 | 98 | — |

EXAMPLE 9

Into each of three wood frames having a dimension of 4×14×0.8 cm/cm was charged 100 g of cement paste formed of a starting material of ordinary portland cement. Then, glass fibers in Comparative Example 1 and Example 7, No. 28 and Example 8, No. 33 were cut in a length of 15 cm and the cut fibers were equally arranged over a width of 4 cm in the longitudinal direction to form a sheet, and 3 g of the resulting sheets were put sixfold on the cement paste. Further, 100 g of the same cement paste as described above was poured on the sheet. Under such a situation, the resulting assembly was left to stand in a room conditioned at 25°C and 65% RH for 28 days. Thereafter, the resulting solidified glass fiber reinforced composite cement was taken out from the wood frame and subjected to a bending test by means of an Instron universal tester to obtain the results as shown in the following Table 16.

Table 16

| Glass fiber used | Comparative Example 1 | No. 28 | No.33 |
|---|---|---|---|
| $ZrO_2$ (%) | — | 15 | 12 |
| $P_2O_5$ (%) | — | 1 | 1 |
| Bending strength ($Kg/m^2$) | 45 | 78 | 75 |

As seen from the results of Table 16, it can be seen that the glass fiber according to the present invention is very suitable for the reinforcing fibers for the composite cement.

What is claimed is:

1. Alkali resistant glass fiber having an alkali solubility of not more than 5 percent and a strength retaining percentage of not less than 90 percent, which consists of

| | | |
|---|---|---|
| $SiO_2$ | 60-67 | mol% |
| $ZrO_2$ | 12-16 | mol% |
| $R_2O$ | 16-20 | mol% |
| [R'O] CaO | 1-3 | mol% |
| $B_2O_3$ | 2-6 | mol% |
| $P_2O_5$ | 1-3 | mol% |
| $SnO_2$ | 0.5-6 | mol% |
| $CaF_2$ | 0.5-2 | mol% | wherein $R_2O$ is $Na_2O$ or a mixture of $Na_2O$ and $Li_2O$ and the sum of $P_2O_5$ and $B_2O_3$ is 4-8 mol percent.

* * * * *

UNITED STATES PATENT OFFICE
CERTIFICATE OF CORRECTION

Patent No. 3,861,927                    Dated  January 21, 1975

Inventor(s) Isao Kimura and Takuji Yoshimura

It is certified that error appears in the above-identified patent and that said Letters Patent are hereby corrected as shown below:

Col. 14, line 16; change "[R'O] CaO" to ---CaO---.

Signed and sealed this 29th day of April 1975.

(SEAL)
Attest:

RUTH C. MASON
Attesting Officer

C. MARSHALL DANN
Commissioner of Patents
and Trademarks